United States Patent
Tickett

[15] 3,652,107
[45] Mar. 28, 1972

[54] APPARATUS FOR SEVERING AND COUPLING A PIPE

[72] Inventor: Edward F. Tickett, El Paso, Tex.

[73] Assignee: Alex B. Reynolds, St. Louis, Mo. a part interest

[22] Filed: July 13, 1970

[21] Appl. No.: 54,398

Related U.S. Application Data

[63] Continuation-in-part of Ser. No. 864,739, Oct. 8, 1969, abandoned.

[52] U.S. Cl. .................................. 285/3, 29/157, 30/101, 137/318, 285/373
[51] Int. Cl. ........................... F16l 21/02, F16l 21/06
[58] Field of Search .................. 137/318, 317, 15; 251/146; 30/101; 82/4.3, 70.2; 29/157; 192/101; 285/3, 15, 16, 373, 197, 4

[56] References Cited

UNITED STATES PATENTS

| 587,092 | 7/1897 | French | 137/317 X |
| 1,532,315 | 4/1925 | Karbowski | 30/101 X |
| 1,811,046 | 6/1931 | Goldhagen | 30/101 |
| 1,898,935 | 2/1933 | Brandriff | 251/146 X |
| 3,004,338 | 10/1961 | Turner | 30/101 |
| 3,108,499 | 10/1963 | Duncan | 137/318 X |
| 3,385,314 | 5/1968 | Thompson | 137/318 |

FOREIGN PATENTS OR APPLICATIONS

| 733,220 | 7/1955 | Great Britain | 285/197 |
| 740,433 | 11/1955 | Great Britain | 285/373 |

Primary Examiner—Thomas F. Callaghan
Attorney—Cohn and Powell

[57] ABSTRACT

This apparatus provides a two-part rotatable housing which is mounted about a continuous gas or other pipeline for the purpose of cutting a section from the pipeline and coupling the separated parts together. The upper portion of the housing includes a built-in cutter assembly having a cutter advancing mechanism and the lower housing portion includes a cup for receiving the severed pipe section. The housing portions are separated by seals which facilitate rotation of the housing about the pipe during the cutting process. The seals prevent leakage from the pipeline and, in addition, electrically isolate the separated parts of the pipe.

21 Claims, 5 Drawing Figures

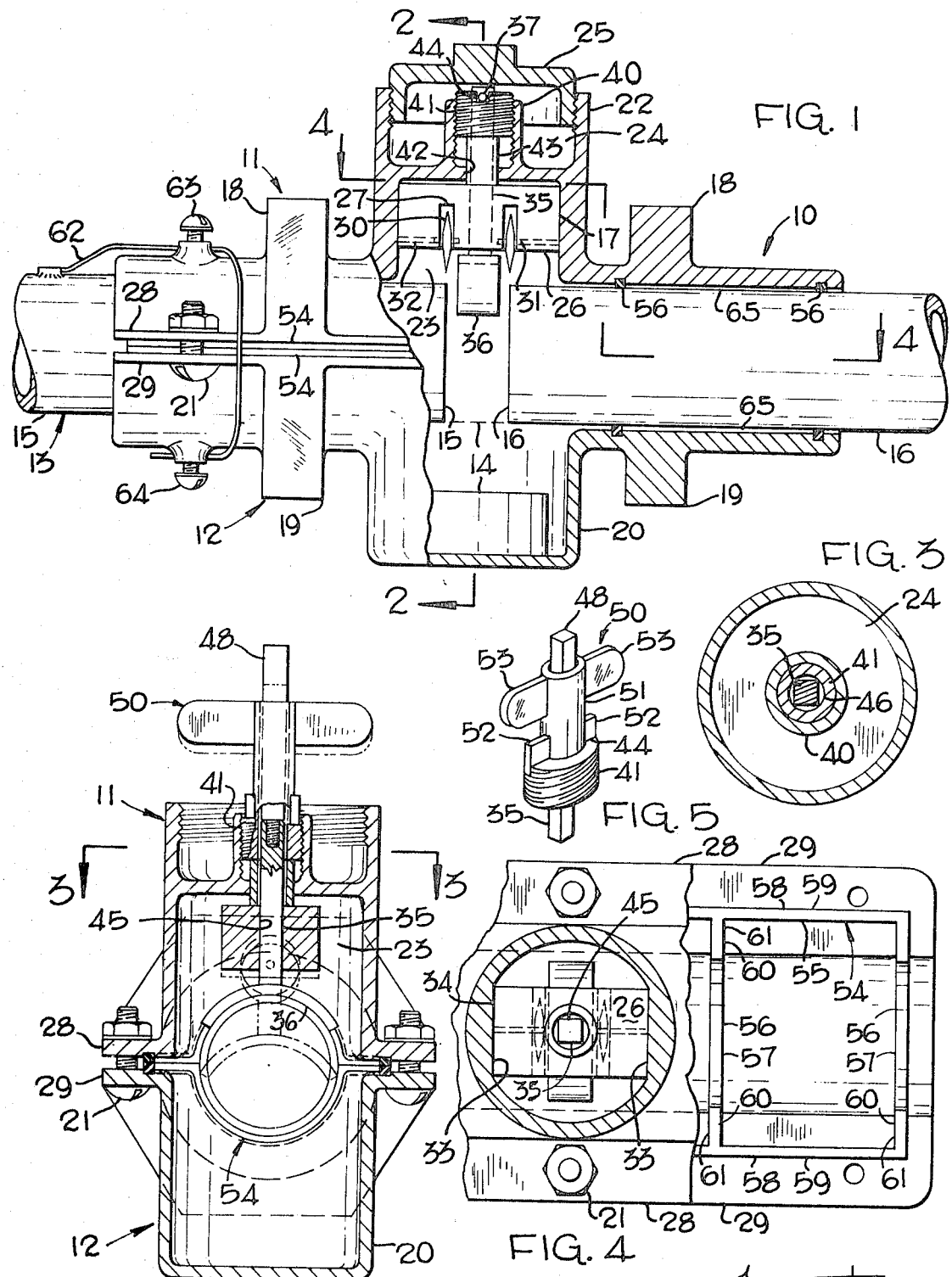

APPARATUS FOR SEVERING AND COUPLING A PIPE

CROSS REFERENCE TO RELATED APPLICATION

This is a continuation-in-part of copending application, Ser. No. 864,739, filed Oct. 8, 1969 and now abandoned.

BACKGROUND OF THE INVENTION

This invention relates in general to an apparatus for severing a pipeline and in particular to an apparatus which provides an insulated coupling between the separated pipeline portions.

Corrosion of metal pipelines is responsible for the destruction of millions of dollars worth of property each year. The replacement cost of these pipelines includes not only the cost of the pipe materials but also the installation expense which, understandably, is particularly high for buried or submerged metal pipelines conveying, for example, natural gas.

One method of approaching the problem of corrosion is the coating of the metal pipes with a protective film such as paint. Another method, much more recent and highly effective, is known as cathodic protection. Cathodic protection is essentially a technique to prevent the corrosion of a metal surface by making that surface the cathode of an electric cell. Essentially, the technique consists of utilizing the pipelines as a cathode, choosing a suitable metal element for an anode and electrically connecting the pipeline and the anode. The choice of the anode material and the creation of an electrical potential difference between the pipeline and the anode ensures that the anode oxidizes rather than the pipeline. The technique frequently requires that sections of pipe be isolated from each other and, because existing pipelines, as well as new pipelines, are prepared for cathodic protection, it is necessary to separate and insulate such existing pipelines. This has been achieved in the past by drilling out a portion of the pipeline and coupling the remaining portions together. The drilling process has been accomplished by the use of a special coupling housing which provides a drilling aperture and the method requires that fluid flow through the pipeline be cut off during the drilling operation.

Several devices are revealed in the prior art which provide a means by which a pipe section may be cut from a pipeline for the purpose of inserting a valve, for example, in an existing pipeline while flow is maintained. However, such devices invariably utilize a stationary housing which is erected about a pipeline and encloses the cutting apparatus within the housing. The cutting apparatus is operated by remote control and differences which exist between these various devices appear to reside in the manner in which the remote control is effectuated and sealing provided. No known device utilizes a rotatable housing which includes a built-in cutter and which, in addition, serves to couple the remaining pipe portions together.

SUMMARY OF THE INVENTION

This apparatus for severing a pipeline and thereafter coupling the separated parts, provides a means of both fluid-sealing the separated pipe portions and, at the same time, ensuring that these portions are electrically isolated from each other. The apparatus is useful for separating continuous pipelines into sections. It may be utilized for existing pipelines, in addition, allow new pipelines to be laid continuously and separated later into convenient sections at desired locations.

The pipe cutter means is operated directly, rather than by remote control, because the apparatus provides a rotatable housing having a built-in cutter which is orbited about the pipe. The housing is sealed effectively during the temporary cutting operation by continuous seals and the same seals provide a permanent sealing means when the cutting operation is completed and the housing securely clamped to the pipe.

The housing provides a body including first and second half-round interconnectable body portions mounted in embracing relation about the pipe for selective rotation. Cutter means is mounted in a cutter compartment in one of said body portions to sever the pipe and a receptacle compartment is provided in the other body portion to receive the severed pipe portion.

The means mounting the body portions include fastener means which interconnect said body portions for selective rotation in a first mounted condition, and clamp said body portions to the pipe in a second mounted condition. The mounting means also include sealing means fluid-sealing the pipe and the body and electrically insulating the separated pipe portions from each other. The sealing means provide a journal bearing face engaging the pipe and facilitating the rotation of the housing about the pipe.

The cutter means includes a cutter block having a pair of cutter wheels disposed in side-by-side relation and mounted for orbital movement about the pipe. Means are provided for advancing the cutter wheels. Said means include a socket provided in one of said body portions and engageable by a threadedly related plug adjustably receivable by the socket and operatively engageable with the cutter block.

A displacement rod for displacing the severed section of the pipe after cutting is mounted in slidable relation to the body to drive said pipe section into the receptacle compartment. An accessible sealing compartment is disposed outwardly of the cutter compartment and the displacement rod extends between the cutter block and the sealing compartment. The displacement rod is accessible by removing a closure cap from the sealing compartment. An extension rod is provided which is attachable to the displacement rod, and said displacement rod serves to support the cutter block in the noncutting position. A key adapted to overfit the extension rod engages the adjustable plug to advance the cutter block.

The sealing means includes first and second sealing portions, each compatibly interfitting an associated body portion and providing substantially semicircular bearing faces adapted to engage the pipe in sliding relation. Each sealing portion is continuous and includes a plurality of semicircular ring elements and longitudinal elements which are interconnected by means of lateral elements. Each sealing portion interfits a compatible continuous groove in its associated housing portion.

The sealing means define intermediate and outer sealing chambers, adjacently disposed longitudinally of the housing.

BRIEF DESCRIPTION OF THE DRAWING

FIG. 1 is an elevational view of the apparatus partly in cross section;

FIG. 2 is a cross sectional view taken on line 2—2 of FIG. 1 but with the closure cap removed and the cutter advancing key in position;

FIG. 3 is a cross sectional view taken on line 3—3 of FIG. 2;

FIG. 4 is a fragmentary view taken on line 4—4 of FIG. 1, and

FIG. 5 is a fragmentary detail illustrating the key for advancing the cutter assembly.

DESCRIPTION OF THE PREFERRED EMBODIMENT

Referring now by characters of reference to the drawing, and first to FIG. 1, it will be understood that the severing and coupling apparatus consists essentially of a housing 10, which constitutes a body, and includes substantially semicircular upper and lower portions 11 and 12, constituting first and second body portions respectively. The housing 10 is rotatively mounted to a pipe 13, conveying natural gas or other material, and is used for the purpose of cutting a section 14 from said pipe 13 by means of a cutter block assembly, generally indicated by numeral 17. The cutter block assembly 17 is built into the housing 10 for orbital movement about the pipe 13 as the housing 10 rotates. When sufficiently cut, the section 14 is displaced from the pipe 13 by means of a drive rod 35 and received by a cup 20, constituting a receptacle, which is provided by the lower housing portion 12. The upper and lower housing portions 11 and 12 are connected by a plurality of fasteners 21, six in number in the preferred embodiment and a pair of continuous seals 54 facilitate rotation of the housing 10 and electrically insulate the separated pipe portions 15 and 16. The fasteners 21 are tightened initially to permit rotation of the housing 10 during a first mounted condition and are completely tightened to clamp said housing 10 in position in a second mounted condition.

The upper housing portion 11 includes a transverse branch pipe, generally indicated by numeral 22, which includes a cutter compartment 23, housing the cutter assembly 17 and the drive rod 35, and a sealing compartment 24. The sealing compartment 24 is disposed above the cutter compartment 23 and is provided with a cap 25 constituting a closure means.

The cutter block assembly 17 includes a substantially rectangular cutter block 26 having recesses 27 serving to mount a pair of cutter wheels 30, each of which is mounted to the cutter block 26 by means of a pin 31 received in a blind hole 32. As shown in FIG. 4, the cutter compartment 23 is partially defined by opposed flat faces 33, which are engaged in sliding relation by the ends 34 of the cutter block 26, said flat faces 33 thereby providing a guide means precluding rotation of the cutter block 26.

The cutter block 26 is held in place before and after the cutting action by the drive rod 35 which constitutes a support means and which is provided with an arcuate saddle 36 at one end and a pin 37 at the other end. During the cutting process, the cutter block 26 is advanced by means of a threadedly adjustable plug and socket assembly. The socket, indicated by numeral 40, is disposed centrally of the sealing compartment 24 and communicates with the cutter block compartment 23 by means of an aperture 42. A pressure sleeve 43 extends between the cutter block 26 and the plug 41, and the plug 41 is notched to provide opposed recesses 44, which receive the drive rod pin 37 in bearing engagement whereby to suspend said drive rod 35. It will be observed from FIG. 3 that the drive rod 35 is substantially square in cross section and that a compatibly square aperture 45 is provided in the cutter block 26 to receive said drive rod in sliding engagement. The compatible shape of the aperture 45 precludes relative rotation of said drive rod 35 and cutter block 26. The plug 41 is annular in shape and includes a circular aperture 46, which permits rotation of the said plug 41 relative to the drive rod 35 when the drive rod bearing pin 37 is removed. It will be understood that the inside diameter of the pressure sleeve 43 is sufficiently great to clear the square section of the drive rod 35.

The drive rod 35 is provided with an extension rod 48 which is threadedly connectable to the upper end of said drive rod 35 when the cap 25 has been removed. When the extension rod 48 is connected, the drive rod bearing pin 37 may be removed and the drive rod saddle 36 and the cutter block 26 lowered until the saddle 36 and the cutter wheels 30 engage the pipe 13.

As shown in FIGS. 2 and 5, the plug 41 is rotated by a turning key 50 having a tubular body 51 receiving the extension rod 48 in sliding relation. The key 50 includes a pair of opposed peg elements 52, compatibly engageable within the plug notches 44, and a pair of wing elements 53 which permit the plug 41 to be rotated into the socket 40 and advance the cutting action of the cutter wheels 30.

Each of the upper and lower housing portions 11 and 12 includes a continuous seal constituting a sealing means and generally indicated in FIG. 4 by numeral 54. The seals 54 are substantially identical and each is recessed into an associated continuous groove 55 provided in the housing portions. Each seal 54 includes a plurality of substantially semicircular elements 56 received within compatible groove portions 57. The seals 54 also include longitudinal elements 58 received within compatible groove portions 59 and the semicircular elements 56 are connected to the longitudinal elements 58 by transverse elements 60 which are received within compatible groove portions 61. The continuous seals and grooves 54 and 55 are preferably of substantially uniform thickness, the groove 55, however, being somewhat shallower, so that each seal 54 projects about its associated groove 55. The upper and lower housing portions 11 and 12 each include oppositely facing lateral flanges 28 and 29 receiving the fasteners 21.

It will be understood from FIG. 2 that as the fasteners 21 are tightened, the semicircular seal elements 56 of each housing portion bear against the pipe 13 with increasing pressure. Likewise, the longitudinal and lateral seal elements 58 and 60 bear against associated seal elements of the other housing portion. Because of this arrangement, the housing 10 is fluid-sealed from the pipe 13 and the housing portions 11 and 12 are fluid-sealed from each other. Further, the housing 10 is electrically insulated from the pipe 13 and when the pipe section 14 has been removed, the separated pipe portions 15 and 16 are no longer in electrical contact with each other. For the purpose of example, it will be assumed that separated pipe portion 15 is the end portion of a buried pipe requiring cathodic protection. In order for the cathodic protection to extend to the housing 10 also, a bond wire clamp 62 is provided which is welded, or otherwise attached, to the pipe portion 15 and connected between the upper and lower housing portions 11 and 12 by means of set-screws 63 and 64. This arrangement provides that the pipe portion 15 and the housing 10 are in electrical contact but that the pipe portion 16 is electrically isolated from the housing 10 and the pipe portion 15.

In order to facilitate rotation of the housing 10 about the pipe 13 during cutting of said pipe 13, each of said upper and lower housing portions 11 and 12 includes a pair of compatible semi-hexagonal collars 18 and 19 respectively to provide wrench lands facilitating the rotation of the housing 10.

It is thought that the structural features and functional advantages of this apparatus for severing and coupling a pipe have become fully apparent from the foregoing description of parts but for completeness of disclosure, the operation of the device will be briefly summarized.

Before the upper and lower body portions are mounted to the pipe 13, the pipe should be cleaned or otherwise prepared to provide a substantially smooth surface. The faces of the continuous seals 54 should be lightly lubricated. It will be understood that the semicircular seal portions 56, when placed together, provide a substantially O-ring configuration having an inside diameter substantially equal to the diameter of the pipe 13. The inside cylindrical faces of the upper and lower housing 11 and 12 are slightly less than semicircular, it being understood that such metallic faces are not intended to engage said pipe 13 directly in the preferred embodiment. When the upper and lower housing portions 11 and 12 are connected together by means of fasteners 21, said fasteners 21 are tightened sufficiently so that the pipe 13 and housing 10 are substantially fluid-sealed but the housing 10 is capable of rotating about the pipe 13 utilizing the O-ring portions of the seals 54 as journal bearings in a first mounted condition.

When the housing 10 has been mounted about the pipe, the cap 25 is removed to expose the plug 41 and the end of the drive rod 35. The drive rod extension 48 is threadedly attached to the drive rod 35 and the pin 37 removed by raising said drive rod 35 slightly. Once the pin 37 has been removed, the rod 35 may be lowered until the saddle 36 engages the pipe 13. The cutter block 26 will move downwardly with the saddle 36 until the cutter wheels 30 engage the pipe 13. By placing the turning key 50 in position about the drive rod extension 48 and inserting the peg elements 52 into the notches 44 formerly occupied by the pin 37, the plug 41 may be rotated downwardly until it engages the pressure sleeve 43. Further advancement of the plug 41 causes cutting pressure to be applied to the cutter wheels 30 and by applying a wrench to the wrench lands provided by the semi-hexagonal collar portions 18 and 19, the housing as a whole may be rotated about the pipe 13. This rotation orbits the cutter wheels 30 and by applying further pressure to the cutting wheels 30 by means of the turning key 50, the pipe 13 may be readily cut to define a removable pipe portion 14. When the cutting process is complete or substantially complete, the housing 10 is oriented with the housing portion 11 uppermost and the drive rod extension 48 is struck with a hammer, thereby punching the removable section 14 into the receiving cup 20. It will be understood that the depth of the cup 20 is sufficiently great to accommodate the outside diameter of the removed section 14 without possibility of said removed section 14 maintaining engagement with the separated pipe portions 15 and 16.

The cutter block 26 is itself precluded from rotation during the rotation of the plug 41 by the flats 33 provided on the interior wall face of the cutter block compartment 23. Flats 33 also serve to guide the cutter block 26. The drive rod 35, by virtue of its square section is slidably received within the compatible square aperture 45 provided in the cutter block 26 and is likewise precluded from rotation as the plug 41 rotates.

When the cutting and separating operation is completed, the plug 41 is reversely rotated and returned to its original position, the key 50 removed and the drive rod 35 lifted upwardly by means of the drive rod extension 48. As the drive rod 35 moved upwardly, it carries the cutter block 26 with it and when the drive rod 35 has been raised sufficiently to expose the aperture receiving the pin 37, said pin 37 may be inserted in place and the original disposition of parts on the cutter block assembly 17 restored. When this condition has been achieved, the drive rod extension 48 is removed and the cap 25 replaced to seal the sealing chamber 24. The fasteners 21 are then tightened to clamp the upper and lower housing portions 11 and 12 securely to the pipe in a second mounted condition. When this second condition is achieved, the housing is fluid-sealed from the separated pipe portions 15 and 16 and the housing portions 11 and 12 fluid-sealed from each other.

The fluid-sealing is enhanced by the provision of four sealing ring elements 56 which define inner and outer sealing chambers. Fluid, for example gas, which fills the open volume between the inner rings, is further sealed from atmosphere by outer secondary sealing chambers, formed by the substantially semi-annular spaces indicated by numerals 65 in FIG. 1, between the inner faces of the upper and lower housing portions 11 and 12 and the separated portions 15 and 16.

When the bonding wire clamp is connected to the pipe portion 15 and the housing 10, said pipe portion 15 and the housing 10 are interpreted in terms of electrical conductivity. The pipe 16, however, is electrically isolated from both of these elements by virtue of the continuous seals 54.

It may be desirable, under some circumstances, to provide the inner surface of each of the housing portions 11 and 12 with a plastic liner. Such liners could be grooved and used in conjunction with the sealing ring elements provided in the preferred embodiment to augment the sealing and isolating function of the continuous seals 54, and in certain cases, might even be used in place of said continuous seals 54.

I claim as my invention:

1. An apparatus for severing and coupling a pipe comprising:
   a. a body including first and second body portions,
   b. mounting means adapted to mount said body portions in embracing relation to the pipe for selective rotation of said body about said pipe,
   c. cutter means mounted in one of said body portions and adapted to sever a portion of the pipe as the body rotates about the pipe, and
   d. receptacle means in the other of said body portions adapted to receive said severed pipe portion.
2. An apparatus as defined in claim 1, in which:
   e. the mounting means includes:
      1. fastening means interconnecting said body portions for the selective rotation about the pipe in a first mounted condition and thereafter clamping said body portions to the pipe in a second mounted condition, and
      2. sealing means between said body portions.
3. An apparatus as defined in claim 2, in which:
   f. the sealing means includes a journal bearing portion engaging the pipe.
4. An apparatus as defined in claim 1, in which:
   e. the cutter means includes a pair of cutter blades disposed in side-by-side relation,
   f. advancing means advance said cutter blades into engaging relation with the pipe to sever the pipe portion, and
   g. displacement means mounted to one of said body portions is adapted to urge said severed pipe portion into the receptacle means.
5. An apparatus as defined in claim 2, in which:
   f. the sealing means includes a plurality of transverse ring elements and a plurality of substantially longitudinal elements operatively interconnected to said ring elements to provide a continuous seal between the body portions.
6. An apparatus as defined in claim 5, in which:
   g. said ring elements include journal bearing faces engaging the pipe.
7. An apparatus as defined in claim 4, in which:
   h. the cutter blades are provided by cutter wheels having an axis of rotation substantially parallel to the longitudinal pipe axis, and
   i. the means advancing the cutter wheels include threadedly related plug and socket elements operatively connected to the cutter wheels.
8. Apparatus for severing and coupling a pipe comprising:
   a. a body including:
      1. a first body portion including a cutter compartment,
      2. a second body portion including a receptacle compartment communicating with the cutter compartment,
   b. fastener means adapted to interconnect said body portions in embracing relation about the pipe for selectively rotating the body about the pipe in a first mounted condition and clamping said body to the pipe in a second mounted condition,
   c. cutter means mounted in the cutter compartment and adapted to sever a portion of the pipe as the body rotates, and
   d. sealing means between said body portions sealing said body portions from each other and being adapted to isolate said body portions from one of the separated pipe portions.
9. An apparatus as defined in claim 8, in which:
   e. the cutter means includes a cutter block having a pair of cutter wheels disposed in side-by-side relation and mounted for orbital movement about the pipe as the housing rotates whereby to remove a longitudinal section thereof,
   f. advancement means between the block and the body selectively engageable with said block and threadedly adjustable for movement relative to the body to advance said cutter block.
10. An apparatus as defined in claim 9, in which:
   g. the advancement means includes a threaded socket in the body and a threaded plug compatibly receivable by the socket and operatively engageable with the cutter block.
11. An apparatus as defined in claim 10, in which:
   h. a displacement rod is adapted to be operatively engageable with the pipe and is mounted in selectively sliding relation to said body to urge said severed pipe portion into the receptacle compartment.
12. An apparatus as defined in claim 11, in which:
   i. a sealing compartment including removable closure means is disposed outwardly of the cutter compartment, and
   j. said displacement rod extends between the cutter compartment and the sealing compartment.
13. An apparatus as defined in claim 12, in which:
   k. an extension rod is attachable to the displacement rod when said closure means has been removed whereby to impart movement to the displacement rod.
14. An apparatus as defined in claim 12, in which:
   k. the threaded plug includes a central aperture, and
   l. the displacement rod is coaxially received by said aperture and selectively supports the cutter block.
15. An apparatus as defined in claim 14, in which:
   m. an extension rod is attachable to the displacement rod, and
   n. a key selectively rotates the plug to advance the cutter block, said key including an aperture receiving the extension rod.
16. An apparatus as defined in claim 8, in which:

e. the sealing means includes first and second sealing portions, each compatibly interfitting an associated body portion and each providing substantially arcuate bearing faces adapted to engage the pipe in sliding relation.

17. An apparatus as defined in claim 16, in which:

f. each sealing portion includes a plurality of substantially semicircular ring elements providing the bearing faces, and g. substantially longitudinal sealing elements operatively connect the ring elements, associated longitudinal elements of each body portion being sealingly engageable with each other.

18. An apparatus as defined in claim 17, in which:

h. a plurality of transverse sealing elements interconnect said ring elements and said longitudinal elements.

19. An apparatus as defined in claim 17, in which:

h. each body portion includes a plurality of transverse arcuate grooves compatibly configurated to receive associated ring elements.

20. An apparatus as defined in claim 17, in which:

h. the sealing ring elements define a longitudinally disposed outer sealing chamber between the pipe and the body.

21. An apparatus as defined in claim 8, in which e. support means selectively attachable to the first body portion supports the cutter means before and after the cutting process.

* * * * *